L. CHAMBONNAUD.
TYPE WRITER.
APPLICATION FILED NOV. 10, 1906.
917,248.
Patented Apr. 6, 1909.
4 SHEETS—SHEET 1.
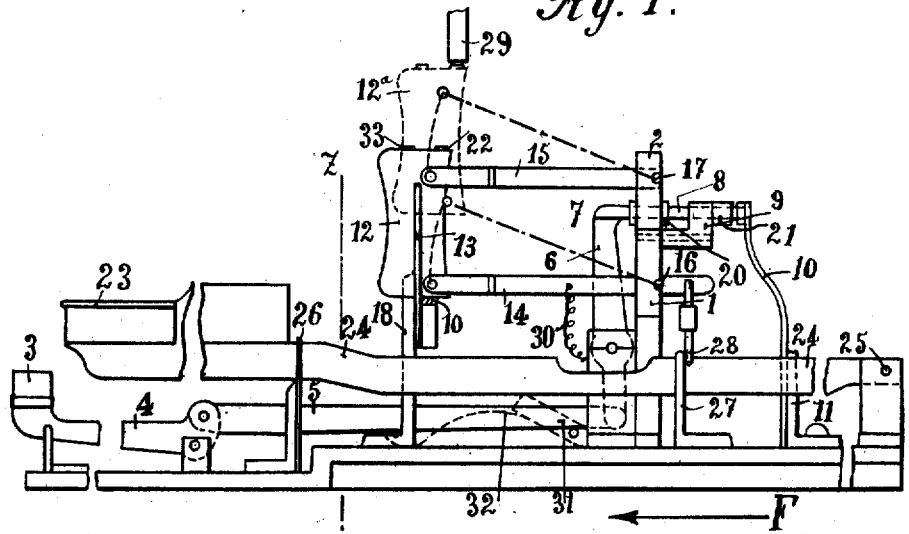
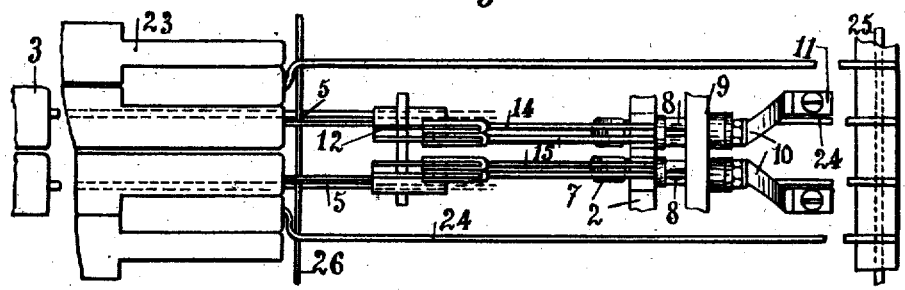
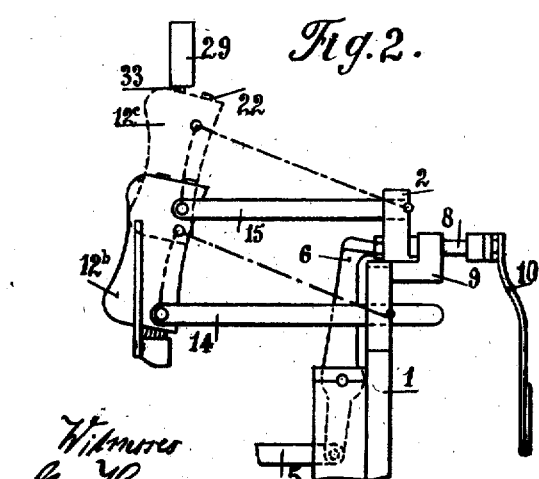
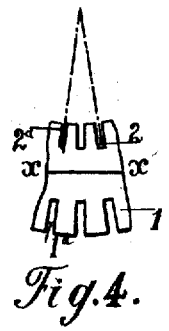

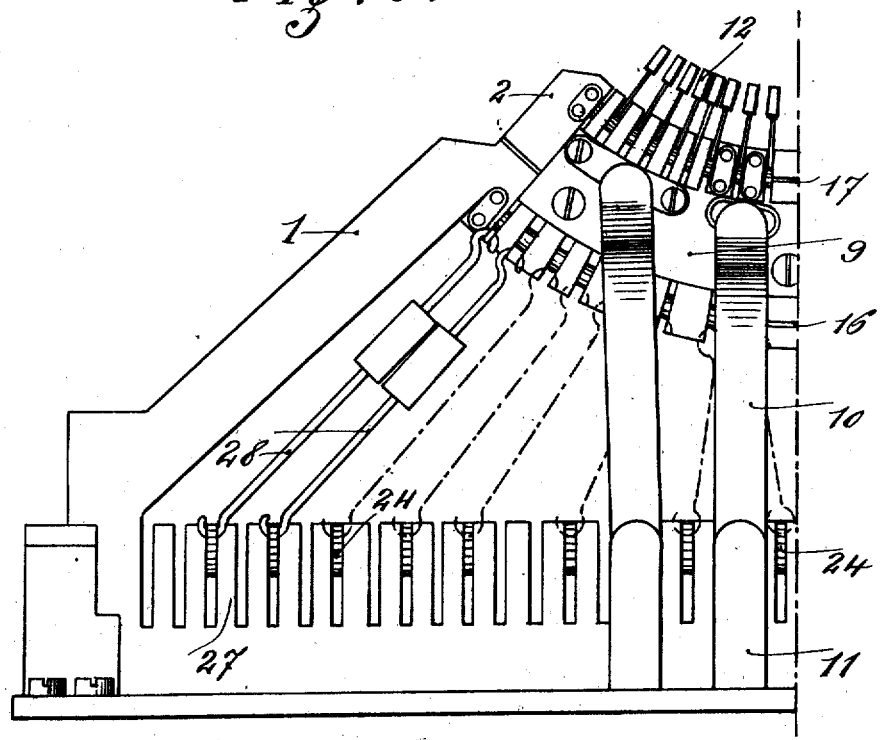

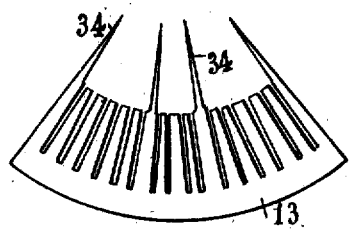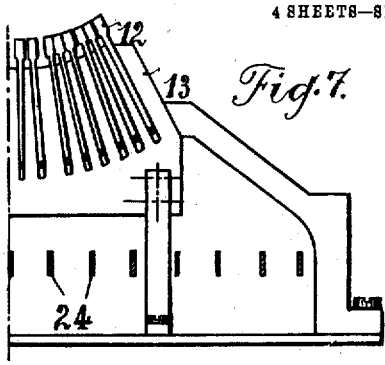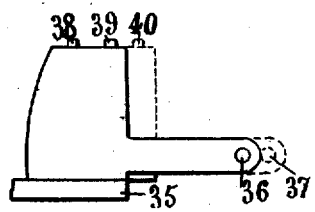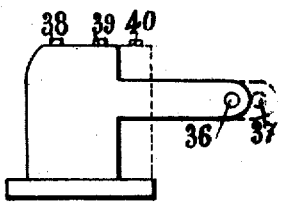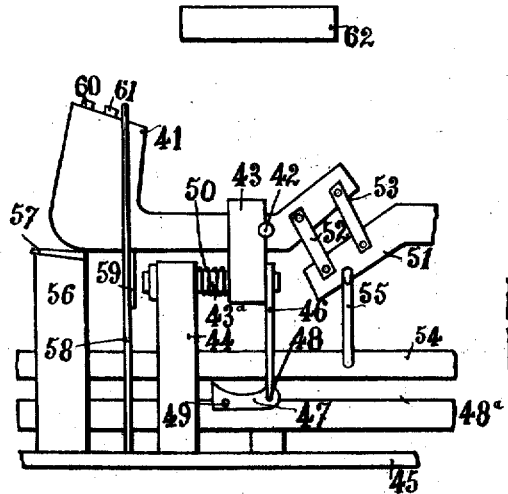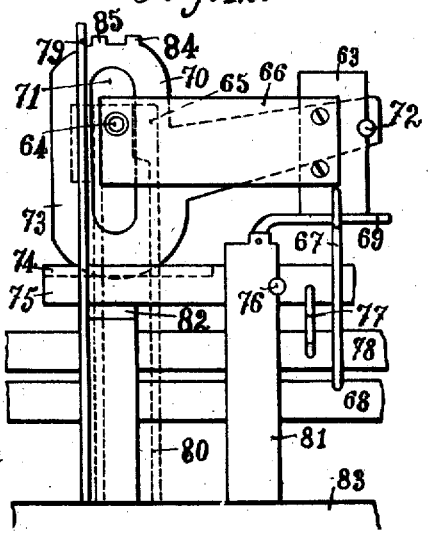

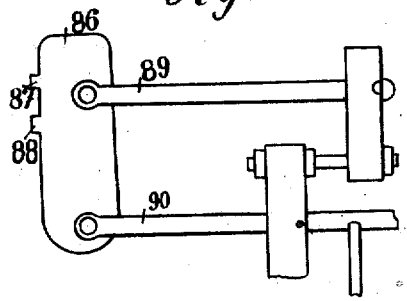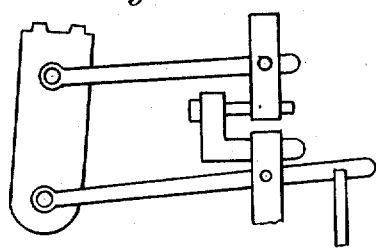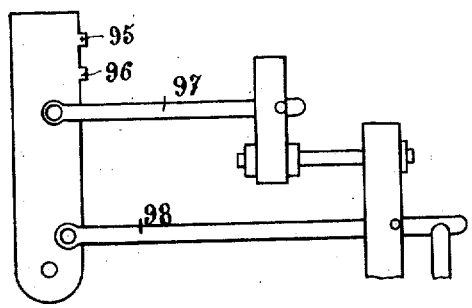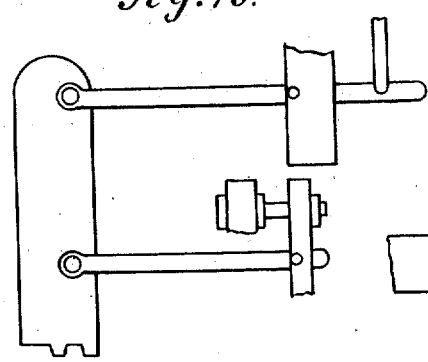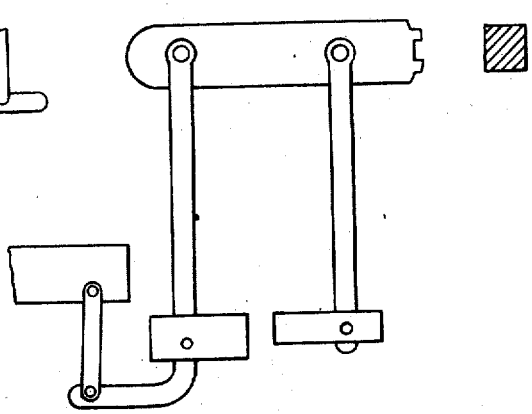

UNITED STATES PATENT OFFICE.

LÉON CHAMBONNAUD, OF PARIS, FRANCE.

TYPE-WRITER.

No. 917,248.    Specification of Letters Patent.    Patented April 6, 1909.

Application filed November 10, 1906. Serial No. 342,918.

*To all whom it may concern:*

Be it known that I, LÉON CHAMBONNAUD, a citizen of the French Republic, and a resident of Paris, France, have invented certain new and useful Improvements in Type-Writers, of which the following is a specification.

My invention relates to typewriting machines and it is applicable to the ordinary form of typewriting machines, to machines for composing and printing, to stenographic machines, and to telegraphic machines and like apparatus.

The objects of my invention are, first, to provide a machine having a plurality of characters to be simultaneously impressed upon a receiving sheet; second, to provide a type bar having a plurality of characters and means carrying and coöperating with the type bar whereby any one of the characters, carried by the type bar, may be selected for printing; and means for actuating the type bars, either, in conjunction with the means for selecting particular characters for printing, or independently of such means.

My invention, generally stated, consists of a machine having a plurality of type-carrying bars, each of which is preferably provided with a plurality of characters, the type bars being arranged in groups, and each group having its own center to which all of the type bars of a group converge. Each type bar is provided with a plurality of characters, any one of which can be selected for printing by means hereinafter disclosed.

Although my invention is illustrated as applied to a machine in which the type bars, each having a plurality of characters, are arranged in a plurality of groups, each group having its own printing point, the invention can however be applied to a machine having but one group of type bars with a common center of convergence for all of the bars, the type bars having one or more characters as described.

My invention consists also in the details of construction and combinations of parts hereinafter described and claimed and illustrated in the accompanying drawings, in which:

Figure 1 is a section of the machine, showing in dotted lines the movement of the type bar when actuated alone by a character-key. Fig. 2 is a detail section showing the movement of a type-bar under the conjoint action of a character-key and of a shift-key. Fig. 3 is a plan view of a portion of the machine. Figs. 4 and 5 are details of the frame to which the rods carrying the type-bars are pivoted, Fig. 5 being a slight modification of Fig. 4. Fig. 6 is a view of a portion of the machine looking in the direction of the arrow F shown in Fig. 1. Fig. 7 is a vertical section on the line Z—Z of Fig. 1, of one half the machine. Fig. 8 is a detail of one form of the plate used for guiding the type bars. Figs. 9 and 10 are modifications of the type-bars. Figs. 11 and 12 show modifications of the means for selecting, for printing, one of the characters carried by a type-bar. Figs. 13 and 14 show modifications of the type bar and its carrying members, whereby the impression of a character is effected by the lateral movement of a member. Fig. 15 shows a modification in the rest position of the type bar. Fig. 16 shows a modification in the relative position of the members of the type bar carrying arms and of the direction in which an impression is made. Fig. 17 shows a modification in the pivoted arms carrying the type bar.

In the principal form of the invention, the type bars 12 are designed to impress their characters upon a receiving sheet of paper, by an upward stroke of the type bars. The type bars are grouped, as shown, in four groups of six, two, two and six bars respectively. The type bars of each group converge to a center separate from the centers of the other groups; thus establishing four independent centers or printing points, thereby enabling the simultaneous printing of four characters, one in each group.

In the principal form of my device each type bar forms one side of a jointed parallelogram or quadrilateral, the other sides of which are formed by an upper rod 15, a lower rod 14, and a frame composed of an upper, laterally movable section 2, and a lower fixed section 1, secured to the base of the machine. In the complete machine, instead of having a separate movable section and a separate fixed section for each type bar, a separate movable section is provided for each group of keys, the fixed section 1 in this case being continuous and extending under the four movable sections. Each rod 15 is pivoted at one end to a type bar and is similarly connected at the other end to a movable section 2 of the frame, as shown at 17. The lower rod 14 is similarly connected to the type bar and to the lower section 1 of the frame, its pivotal connection to the latter being indicated at 16. The lower rod 14 extends beyond its pivotal point 16, the extended end being connected, by means of an adjustable link 28, to the bar 24 of a character key 23, pivoted as indicated at 25 to the frame.

The sections 1 and 2 of the frame are provided with slots grouped as are the type bars, the slots of each group converging toward its own center. These slots can be interrupted as shown at $1^n$ and $2^n$ in Fig. 4 or continuous as shown in Fig. 5, and are designed to receive the pivoted ends of the rods 14 and 15 and to permit these rods to swing in carrying a type-bar to the printing surface 29. The lines $x$—$x$ Fig. 4 and $y$—$y$ Fig. 5 indicate the line of division between sections 1 and 2. The upper section 2 of the frame is made to move laterally in order that the character 33 can be printed, the character 22 being printed when the section 2 is in its normal position in alinement with section 1.

The lateral displacement of the movable section 2 is accomplished by means of a shift key 3, having a shank 4 forming a bell-crank lever pivoted to the base of the machine and connected to one end of a link 5, the other end of which is connected to a lever 6 pivoted, at a point intermediate its ends, to a support extending from the base of the machine. The upper end 7 of the lever 6 bears against the outer ends of a pair of sliding bars 8 which carry a section 2 and which are supported in a vertical extension of a plate 9 upon which the section 2 slides, when displaced, the plate 9 being fixed to the stationary section 1.

The bars 8 are normally pressed toward the keyboard, keeping the section 2 in alinement with section 1, by a spring 10 secured to a bracket 11 carried by the base of the machine. The bars 8 are provided as at 20 and 21, with elastic cushions to take up the shock and deaden the noise occasioned by the operation of the machine. The power rod 14 is provided with a spring 30 to aid in returning the type-bar to its normal position. The character-keys are returned to their normal position by a spring 32 which tends to hold elevated a bar 31, pivoted to the base of the machine and supporting the key levers. The type bars are directed, in their swinging movement by a guide plate 13, provided with slots, grouped and disposed similarly to the slots of sections 1 and 2 of the frame. This guide plate is carried by a support 18 secured to the base of the machine, and supporting a cushion stop 19, upon which the type bars rest. A comb-like plate 26, secured to the machine, guides the key levers and shift-levers in their vertical movement, the key-levers having an additional comb-plate 27.

The guide plate 18 may be of the form shown in Fig. 8, instead of that shown in Fig. 7. In the construction shown in Fig. 8, the plate is formed with prolongations 34, this construction permitting of increased accuracy in the guidance of the type bars to their respective printing points.

The operation of the principal form of my invention is as follows:—If it be desired to print the character 22 carried by the keyboard, it will be but necessary to depress the character key 23, which, by means of its connecting link 28, will cause the rod 14 to turn on its fulcrum 16, thereby causing the type-bar to assume the dotted position, $12^a$, shown in Fig. 1. If the pressure be now removed from the key 23, the springs 32 and 30 will cause the parts to resume their normal position. If, however, it be desired to print the character 33, the shift-lever 3 must be depressed. This lever, by means of its connection to the lever 6, moves the latter about its fulcrum, thereby forcing the movable section 2, of the frame, backward against the resistance of the spring 10; hence the joint 17 of the type-bar parallelogram will be moved back of its normal position, the pivot 16 however remaining fixed as before, and the type bar will then assume the position $12^b$ of Fig. 2. If simultaneously with the depression of the shift-key 3, or subsequently while the shift key is held depressed, the character key 23 be operated, the type-bar with its connected rods will be caused to travel to the dotted position $12^c$, shown in Fig. 2, thus printing the character 33. If the keys 3 and 23 be now released, the springs 10, 30 and 32 will cause the parts to return to their normal position.

In the form shown in Figs. 9 and 10, the type bar is formed with an integral arm having a pivot point 36 by means of which it can be pivoted to the slotted frame, which for this construction is formed of one piece, hence moves laterally in its entirety. In this construction, the swinging movement of the type bar to print either of its characters, 38 or 39, is accomplished by a lever 35 which moves vertically. The dotted positions 37 and 40, in these figures, represent respectively the positions of the pivot 36 and the character 39 after the type bar has been moved laterally.

In Fig. 11, I have shown a form of my device in which the type bar 41 is provided with an integral arm pivoted at 42 to a slotted frame 43 which is mounted to slide on a support $43^a$, carried by an upright 44, secured to the base 45 of the machine. A spring 50 interposed between the frame 43 and the support 44 normally holds the type-bar in the position shown in Fig. 11.

The forward end of the type bar rests upon a support 56 provided with a cushion 57. A slotted guide plate 58, having a cushion 59, is provided to guide the movements of the type bars. The end of the arm of the type-bar, has pivotally connected thereto two links 52 and 53, these in turn are pivotally connected to a member 51 which forms the fourth side of quadrilateral or parallelogram. This member 51 is connected by a link 55 to a character-key 54.

The shift-key for the construction shown in Fig. 11, is indicated at 48*. It has a connection 47 being joined at 48 to a member 46 attached to the frame 43. Under the sole action of the character-key 54, the character 60 will be impressed at the printing surface 62; but if the shift-key 48* be operated in conjunction with the character-key, the frame will be moved forward and the character 61 will be printed.

In Fig. 12 the type bar 70 is formed with an integral arm which is pivoted at 72 to a slotted frame 63 carried and supported by a spring 69, one end of which is secured to a support 81 extending from the base 83. A plate 66 is secured at one end to the frame 63 and extends therefrom to the head 73 of the type bar, at which end it is pivoted at 64 to an end 65 of a support 80 secured to the base 83. The pivot 64 passes through an elongated slot 71 formed in the head of the type bar, this slot permitting the head of the type bar to swing past the pivot. The lower edge of the head of the type bar is curved from the point 64 as a center, and rests in a groove 74 formed in the upper surface of a bar 75, pivoted at 76 to the support 81 and secured at its end remote from the head of the type bar, to a key-lever 78 by a link 77. A slotted plate 79 guides the type bar. This plate is secured to a support extending from the base 83, the upper end of this support being provided with a cushion 82 upon which the bar 75 rests. A link 67 connects the frame 63 to a shift-key 68. In the operation of this form of the invention, the key-lever 78, when depressed, rocks the bar 75 about its axis 76, thereby elevating the end of the bar upon which the head of the type-bar rests. This movement of the bar 75, swings the type bar on its pivot 72, thereby impressing its character 84 upon the receiving sheet. If it be desired to print the character 85, the shift lever 68, is first depressed. This movement, by means of the link 67, lowers the frame 63, hence the pivot 72 of the type-bar; if the key-lever be now depressed the character 85 will be impressed at the printing point, the lowering of the pivot of the type bar, causing the head thereof to describe a lower arc than that followed when the type bar is actuated under the sole impulse of the key-lever.

In the construction shown in Figs. 13 and 14, the impression of a character is effected by a lateral movement of the slotted frame; and the selection of a character for printing is effected by a swinging movement of the quadrilateral frame about its pivot in the fixed section of the slotted frame. In Fig. 13, 86 indicates the type bar 87 and 88 the characters carried thereby, 89 the upper rod and 90 the lower rod. In Fig. 14, 95 and 96 indicate the characters carried by the type bar, and 97 and 98 indicate respectively the rod connected to the movable section of the slotted frame, and the rod connected to the fixed section of this frame.

Fig. 15 shows a form of the invention in which the type-bar, when at rest, lies at an angle to the frame.

Fig. 16 represents a construction in which the character is selected and impressed as in the principal form of the device, the difference being that the type-bar is arranged to print on the downward stroke instead of on the upward stroke as in the main form.

Fig. 17 shows another arrangement for effecting the selection and printing of a character. In this form the character prints on the rearward stroke of the type-bar.

Having thus described my invention, what I claim as new and desire to secure by Letters Patent thereon, is:

1. In a typewriting machine, the combination with a type-bar, of a frame therefor consisting of a horizontally reciprocatory section, a fixed section, a rod pivoted at one end to the type-bar and pivoted at the other end to the reciprocatory section, and a rod pivoted at one end to the type-bar and pivoted at the other end to the fixed section, means for reciprocating the reciprocatory section, and means for oscillating the type-bar.

2. In a typewriting machine, the combination with a type-bar having a plurality of characters, of a frame composed of an upper movable section and a lower fixed section, an upper rod pivoted at one end to the type-bar and pivoted at the other end to the movable section, a lower rod pivoted at one end to the type-bar and pivoted at the other end to the fixed section, slidable bars carrying the movable section, a spring bearing against one end of the slide-bars and adapted to yieldingly keep the movable section in its normal position, a lever bearing against the other end of the slidable bars and adapted to displace the section carried thereby, means adapted to actuate the lever, and means connected to the rod that is pivoted to the fixed section and adapted to vibrate that rod about its fulcrum.

3. In a typewriting machine, the combination with a type-bar having a plurality of characters of a frame consisting of an upper laterally movable section and a lower fixed section, an upper rod and a lower rod, each pivoted at one end to the type bar the upper rod being pivoted at its other end to the movable section and the lower rod being pivoted at its other end to the fixed section, slide bars carrying the movable section, a bracket supporting the slide bars, a spring bearing against one end of the slide-bars and adapted to keep the movable section in its normal position, a lever bearing against the other end of the slide-bars, a shift-key connected to the lever, a character key connected to the lower rod beyond its pivotal connection to the fixed section of the frame, and a spring connected to the lower pivoted bar and adapted to return that bar to its normal position.

4. In a typewriting machine adapted to print simultaneously a plurality of characters, type bars arranged in a plurality of groups each type-bar bearing a plurality of characters, and each group of bars having an independent center toward which all of type bars of a group converge; an upper rod and a lower rod pivoted to each type-bar; a frame to which the other ends of the rods are pivoted, the frame consisting of a plurality of upper laterally movable sections corresponding in number to the groups of type-bars and a lower fixed section common to all of the upper movable sections, both sections of the frame being slotted to receive the ends of the rods, the upper rods being pivoted to the movable sections and the lower rods being pivoted to the fixed sections, the slots of the frame being grouped to correspond with the grouping of the type-bars and radially arranged to correspond therewith; a slotted plate adapted to guide the type-bars the slots being grouped and arranged to correspond with the type-bars and with the slots of the frame means connected to the lower pivoted rods and to the character keys and adapted through the actuation of the latter to oscillate the typebars, means controlling each movable section and connected to a properly disposed shift-key and adapted to displace a movable section under the impulse of a shift-key; and means adapted to return the parts to their normal position.

In testimony whereof I affix my signature.

LÉON CHAMBONNAUD.

In the presence of—
VICTOR PRÉVOST,
HANSON C. COXE.